United States Patent
Rohl et al.

(10) Patent No.: US 10,913,166 B1
(45) Date of Patent: Feb. 9, 2021

(54) GRIPPER

(71) Applicant: Robert Bosch GmbH, Stuttgart (DE)

(72) Inventors: Daniel Rohl, River Falls, WI (US); Mark Price, New Richmond, WI (US)

(73) Assignee: Syntegon Packaging Technology, Inc., New Richmond, WI (US)

(*) Notice: Subject to any disclaimer, the term of this patent is extended or adjusted under 35 U.S.C. 154(b) by 0 days.

(21) Appl. No.: 16/582,802

(22) Filed: Sep. 25, 2019

(51) Int. Cl.
*B25J 15/10* (2006.01)
*B25J 9/12* (2006.01)

(52) U.S. Cl.
CPC ............... *B25J 15/10* (2013.01); *B25J 9/123* (2013.01)

(58) Field of Classification Search
CPC ......... B25J 15/10; B25J 9/123; B65G 47/847; B65G 47/90
USPC ................................................. 294/116, 86.4
See application file for complete search history.

(56) References Cited

U.S. PATENT DOCUMENTS

| | | | |
|---|---|---|---|
| 1,621,701 A * | 3/1927 | Yanney | B66C 1/425 294/115 |
| 1,885,377 A * | 11/1932 | Robinson | A01B 1/18 294/50.7 |
| 2,757,038 A * | 7/1956 | Drill | B66C 1/425 294/106 |
| 3,179,460 A * | 4/1965 | Gunzelmann | B66C 1/442 294/63.1 |
| 4,260,187 A * | 4/1981 | Frosch | B64G 1/646 294/86.4 |
| 5,437,490 A | 8/1995 | Mimura et al. | |
| 7,234,744 B2 | 6/2007 | Osten et al. | |
| 7,395,136 B2 | 7/2008 | Osten | |
| 7,445,260 B2 | 11/2008 | Nihei et al. | |

* cited by examiner

*Primary Examiner* — Paul T Chin
(74) *Attorney, Agent, or Firm* — Maginot, Moore & Beck LLP (57) ABSTRACT

A gripper includes fingers, which are configured to interact with an object. A first mount supports a first finger. A second mount supports a second finger. A support plate supports these mounts. A cam plate is configured to interact with the first mount and the second mount to provide a first arrangement and a second arrangement. When the first and second mounts are in the first arrangement, the gripper is provided with a first distance between the first finger and the second finger when the gripper is in an open position to receive and/or release the object. When the first and second mounts are in the second arrangement, the gripper is provided with a second distance between the first finger and the second finger when the gripper is in the open position. The second distance is greater than the first distance.

20 Claims, 10 Drawing Sheets

GRIPPER

FIELD

This disclosure relates generally to a gripper.

BACKGROUND

In general, there are some end of arm tooling (EOAT) technologies that use pneumatic grippers to pick up and place products at predetermined locations. To provide these functions, these EOAT technologies tend to have grippers with grasping mechanisms, which are specifically designed to handle a specific type of product with clamping actions that are driven by pneumatics. Since these EOAT technologies are configured for a specific type of product, their pneumatic grippers tend to have difficulty in picking up and placing other types of products when there are differences in product composition, product structure, product size, or other factors.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, the gripper includes a plurality of fingers, a plurality of mounts, a support plate, and a cam plate. The plurality of fingers include at least a first finger and a second finger. The plurality of mounts include a first mount to support the first finger, and a second mount to support the second finger. The support plate is structured to support the first mount and the second mount. The cam plate is configured to interact with the first mount and the second mount to provide a plurality of arrangements on the support plate. The plurality of arrangements include a first arrangement and a second arrangement. When the first mount and the second mount are in the first arrangement, the gripper is provided with a first distance between the first finger and the second finger when the gripper is in an open position. When the first mount and the second mount are in the second arrangement, the gripper is provided with a second distance between the first finger and the second finger when the gripper is in the open position. The second distance is greater than the first distance such that the gripper is configured to accommodate a larger object when the first mount and the second mount are in second arrangement than when the first mount and the second mount are in the first arrangement.

According to at least one aspect, a system includes a servo and a gripper. The servo is configured to drive the gripper. The gripper includes a plurality of fingers, a plurality of mounts, a support plate, and a cam plate. The plurality of fingers include a first finger and a second finger. The plurality of mounts include a first mount to support the first finger, and a second mount to support the second finger. The support plate is configured to support the first mount and the second mount. The cam plate is configured to interact with the first mount and the second mount to provide a first arrangement and a second arrangement on the support plate. When the first mount and the second mount are in the first arrangement, the gripper is provided with a first distance between the first finger and the second finger when the gripper is in an open position. When the first mount and the second mount are in the second arrangement, the gripper is provided with a second distance between the first finger and the second finger when the gripper is in the open position. The second distance is greater than the first distance such that the gripper is configured to accommodate a larger object when the first mount and the second mount are in the second arrangement than when the first mount and the second mount are in the first arrangement.

According to at least one aspect, a gripper includes a plurality of fingers, a linear actuator, a plurality of mounts, a support plate, a cam plate, and a finger adjustor. The plurality of fingers include a first finger and a second finger. The linear actuator is configured to drive an action of the plurality of fingers. The plurality of mounts include a first mount to support the first finger and a second mount to support the second finger. The support plate is configured to support the plurality of mounts in a plurality of arrangements on the support plate. The plurality of arrangements include a first arrangement and a second arrangement. The cam plate is configured to interact with the plurality of mounts to provide the first arrangement and the second arrangement. The cam plate is configured to move about the linear actuator. The finger adjustor is connected to the first mount such that the first mount is configured to move with the finger adjuster. When the finger adjustor moves away from the linear actuator, the first mount urges the cam plate to move the second mount towards a first position associated with the first arrangement to achieve a first distance between the first finger and the second finger. When the finger adjustor moves towards the linear actuator, the first mount urges the cam plate to move the second mount towards a second position associated with the second arrangement to achieve a second distance between the first finger and the second finger. The second distance is greater than the first distance.

These and other features, aspects, and advantages of the present invention are discussed in the following detailed description in accordance with the accompanying drawings throughout which like characters represent similar or like parts.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
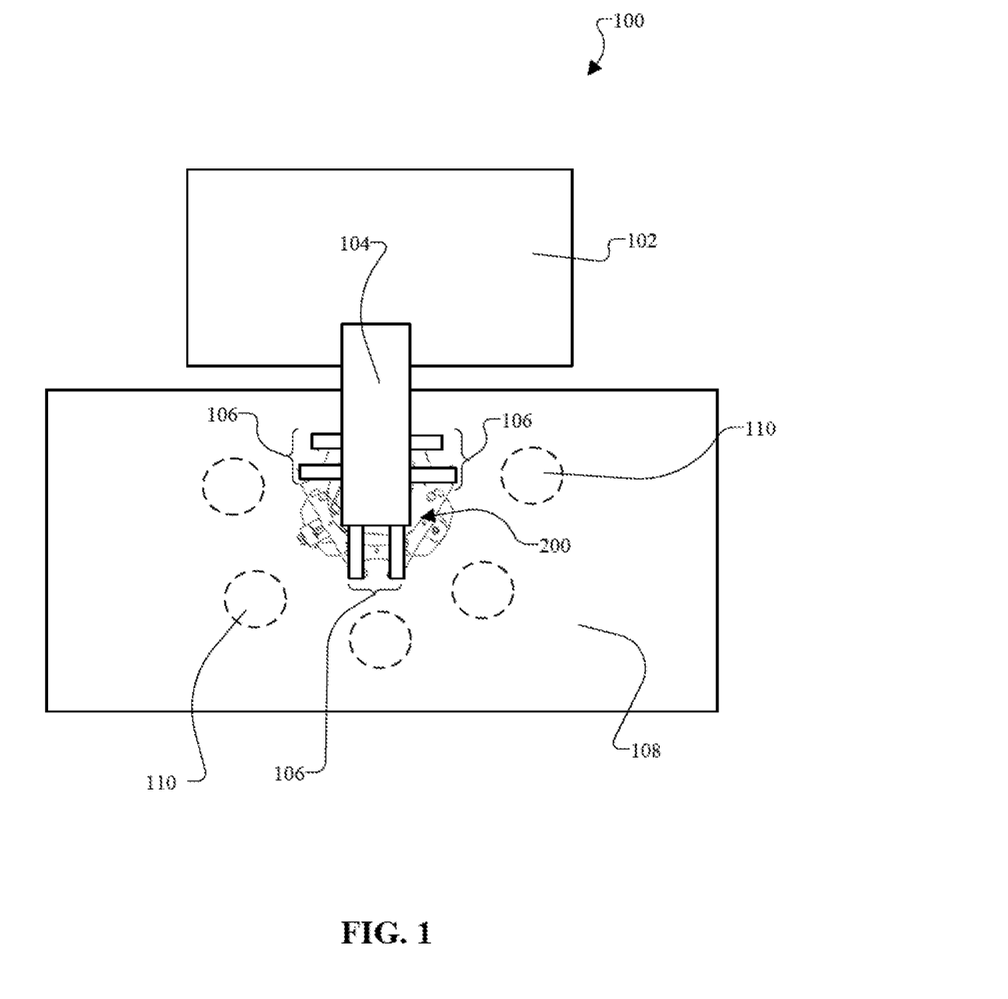
FIG. 1 is a diagram of a system that includes a gripper according to an example embodiment of this disclosure.

FIG. 1 is a diagram that shows a top view of an example of a system 100, which includes at least one gripper 200 according to an example embodiment. In this example, the system 100 includes a machine 102 (e.g., robot) with at least one servo, which is configured to drive and/or control a movement of the gripper 200. Also, in this example, the system 100 includes a support structure 104, which is configured to support the gripper 200. The system 100 includes a suitable number of robot arms 106 for the gripper 200. In this case, the robot arms 106 are configured to connect to corresponding parts of an interface (e.g., first plate 218) of the gripper 200. For example, in FIG. 1, the system 100 includes three pairs of robot arms 106 corresponding to the three fingers 202 of the gripper 200. In this case, the robot arms 106 operably connect the machine 102 to the gripper 200.

In an example embodiment, the system 100 is operable to perform pick-and-place applications. More specifically, for instance, the machine 102 is configured to control and drive the gripper 200 via at least one servo and/or controller. In response to control signals, the gripper 200 is operable to pick up an object at a source location and place the object at a target location. The target location may be the same as the source location or different from the source location. The target location may be at a same height or a different height compared to that of the source location. For instance, as non-limiting examples, FIG. 1 shows a workspace 108, which includes at least one work-surface with a number of non-limiting examples of predetermined locations 110, where the machine 102 directs the gripper 200 to pick-up and/or place the object based on its current location. The gripper 200 is advantageously configured to interact (e.g., receive, obtain, grasp, hold, release, etc.) with various types of objects (e.g., soft, fragile, rigid, round, polygonal, large, small, etc.) in a safe and efficient manner. For instance, as a non-limiting example, the gripper 200 is configured to interact with food products (e.g., biscuits, cookies, etc.) or other suitable objects. In addition, the gripper 200 provides an adjustable gripping action, which is advantageous in enabling the gripper 200 to provide suitable gripping actions for various objects.

In FIG. 1, the gripper 200 is configured to perform at least a gripping action such that the gripper 200 is at least operable to pick-up, hold, and place an object at predetermined locations 110 of the workspace 108. To provide this gripping action, the gripper 200 is configured to position its fingers 202 in an open position and a closed position. When in the open position, the gripper 200 has its fingers 202 spread and spaced apart to receive, obtain, and/or release an object. When in the closed position, the gripper 200 has its fingers 202 coming together to grasp and hold the object. A distance between fingers 202 (and/or fingertips 204) in the open position is greater than a distance between fingers 202 (and/or fingertips 204) in the closed position. Also, the gripper 200 is mechanically adjustable to provide gripping actions, which accommodate various objects in an effective manner. For example, the gripper 200 includes a number of grip settings that provide gripping actions of various sizes to accommodate various objects.

Figure 2A:
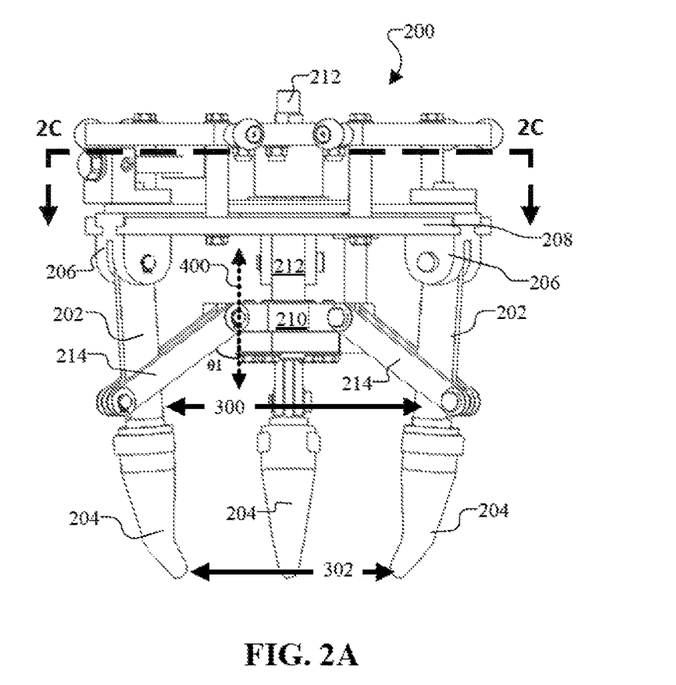
FIG. 2A is a side view of the gripper configured with a first grip setting and in an open position according to an example embodiment of this disclosure.
Figure 2B:
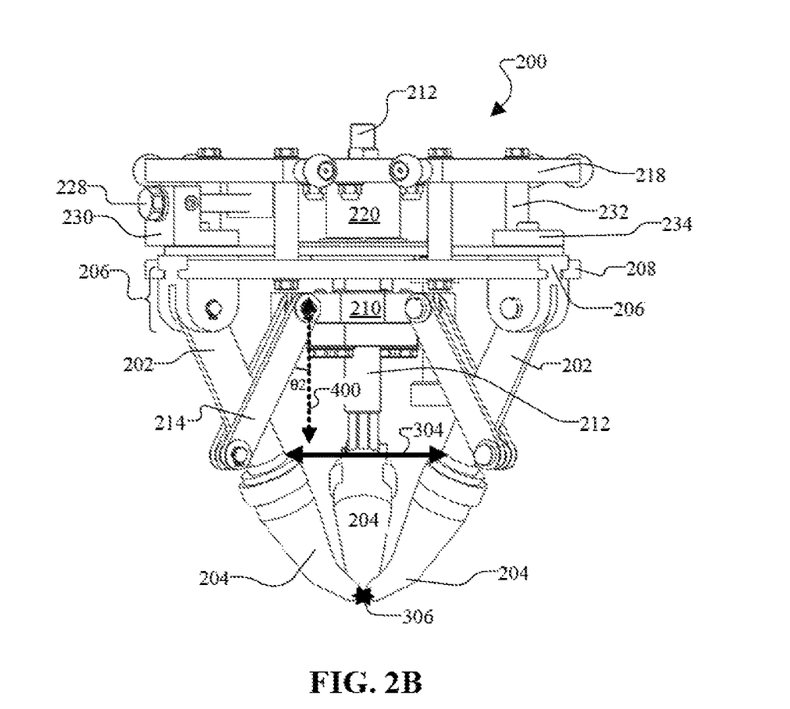
FIG. 2B is a side view of the gripper configured with a first grip setting and in a closed position according to an example embodiment of this disclosure.
Figure 2C:
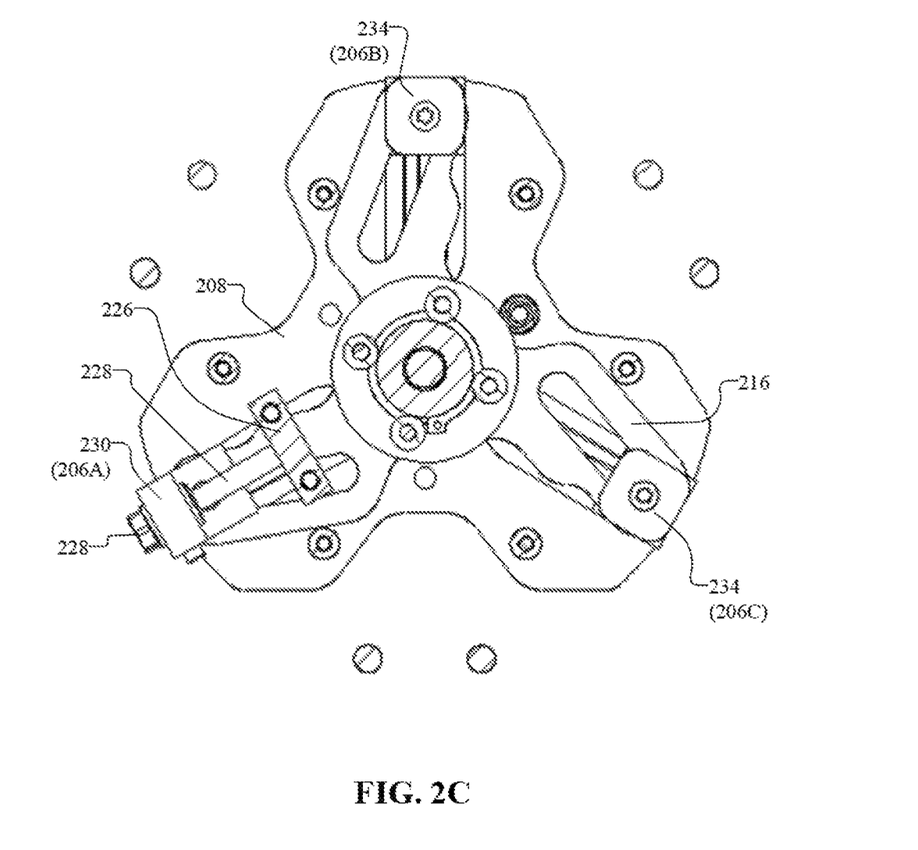
FIG. 2C is a cross-section, taken at line "2C-2C" of FIG. 2A, that shows the gripper with the first grip setting according to an example embodiment of this disclosure.

FIGS. 2A, 2B, and 2C illustrate an example of the gripper 200, which is set at a first grip setting. In this first grip setting, the gripper 200 includes a set of mounts 206, which hold the fingers 202 and which are disposed on peripheral portions of the support plate 208. For example, the mounts 206 include blocks, block-like elements, any suitable components, or any combination thereof. In this first grip setting, the gripper 200 is configured to provide an open position and a closed position. For example, FIG. 2A illustrates the gripper 200 in an open position of the gripping action. More specifically, when in this open position, the gripper 200 is configured to provide a first dimension 300 between fingers 202 and a second dimension 302 between fingertips 204. In this example, the first dimension 300 is larger than the second dimension 302. However, in other examples, the first dimension 300 is substantially similar to or equal to the second dimension 302. Furthermore, as shown in FIG. 2A, when the gripper 200 is in the open position, the gripper 200 includes a second plate 210 in the first position (e.g., lower position) along a linear actuator (e.g., ball screw 212) such that the links 214 extend at a first angle θ1 with respect to an axis 400 that is parallel to a longitudinal axis 402 (FIG. 9) of the linear actuator (e.g., ball screw 212).

FIG. 2B illustrates the gripper 200 in a closed position while in the first grip setting. When the gripper 200 is configured in this first grip setting, the gripper 200 is configured to provide a third dimension 304 between fingers 202 and a fourth dimension 306 between fingertips 204 when in the closed position of the gripping action. In this example, the third dimension 304 is larger than the fourth dimension 306. Also, in this example, as shown in FIGS. 2A and 2B, the first dimension 300 is greater than the third dimension 304 while the second dimension 302 is greater than the fourth dimension 306. In this regard, these dimensions of the gripper 200 are set such that the open position provides greater space for the receipt and/or release of an object while the closed position provides for the holding of the object. Furthermore, as shown in FIG. 2B, when the gripper 200 is in the closed position, the gripper 200 includes the second plate 210 in the second position (e.g., upper position) along the linear actuator (e.g., ball screw 212) such that the links 214 extend at a second angle θ2 with respect to the axis 400. In this regard, as shown in FIGS. 2A and 2B, the second angle θ2 is less than the first angle θ1 so that the fingers 202 and/or fingertips 204 are angled closer to each other to achieve the closed position.

FIG. 2C illustrates a cross-section, taken at line 2C-2C of FIG. 2A, which provides a view of the first grip setting. This first grip setting is configured when the set of mounts 206, which hold corresponding fingers 202, are positioned in a first arrangement. In this example, for instance, the set of mounts 206 include a first mount 206A, a second mount 206B, and a third mount 206C. In FIG. 2C, the first mount 206A is connected to a finger adjustor 230, the second mount 206B is connected to a cap 234, and the third mount 206C is connected to another cap 234. In this first arrangement, the first mount 206A, the second mount 206B, and the third mount 206C are disposed at peripheral portions of the support plate 208 and peripheral portions of the cam plate 216. More specifically, in this first arrangement, the first mount 206A, the second mount 206B, and the third mount 206C are disposed at outermost positions, which are defined along the support plate 208 and the cam plate 216, respectively.

In an example embodiment, the set of mounts 206 are positioned into this first arrangement via a finger adjustment assembly. The finger adjustment assembly includes at least a mount 226, an adjusting device 228 (e.g. a bolt or any suitable fastener), and the finger adjustor 230. More specifically, the mount 226 is secured to a first plate 218 while being configured to interact with the adjusting device 228. For example, the mount 226 is positioned at an inner portion, which is between a center of the first plate 218 and a peripheral portion of the first plate 218. The mount 226 is configured to receive the adjusting device 228 so that the adjusting device 228 is configured to move through and within the mount 226. Meanwhile, the adjusting device 228 is configured to move away from the mount 226 and move towards peripheral portions of the support plate 208 to provide this first arrangement and first grip setting. Also, as shown in FIG. 2C, there is a gap between the finger adjustor 230 and the mount 226 when the adjusting device 228 is adjusted such that the set of mounts 206 are in this first arrangement.

In addition, when moving away from the mount 226 and towards peripheral portions of the support plate 208, the adjusting device 228 is configured to move the set of mounts 206 into at least the first arrangement. More specifically, the adjusting device 228 is secured to the finger adjustor 230 so that the finger adjustor 230 moves with the adjusting device 228. In addition, the finger adjustor 230 is secured to the first mount 206A so that the first mount 206A moves with the finger adjustor 230. In this regard, the finger adjustor 230 is a mechanical structure that is configured to connect to and move with the adjusting device 228 and the first mount 206A. As an example, the finger adjustor 230 is an L-shaped mechanical structure, which includes a side that connects to the adjusting device 228 and a side that connects to the first mount 206A. Accordingly, when the first mount 206A moves, the first mount 206A moves the cam plate 216. When the cam plate 216 rotates, the cam plate 216 urges the other mounts (e.g., the second mount 206B and the third mount 206C) to move into similar corresponding positions along the support plate 208 and the cam plate 216 to provide the first arrangement and the first grip setting.

Figure 3A:
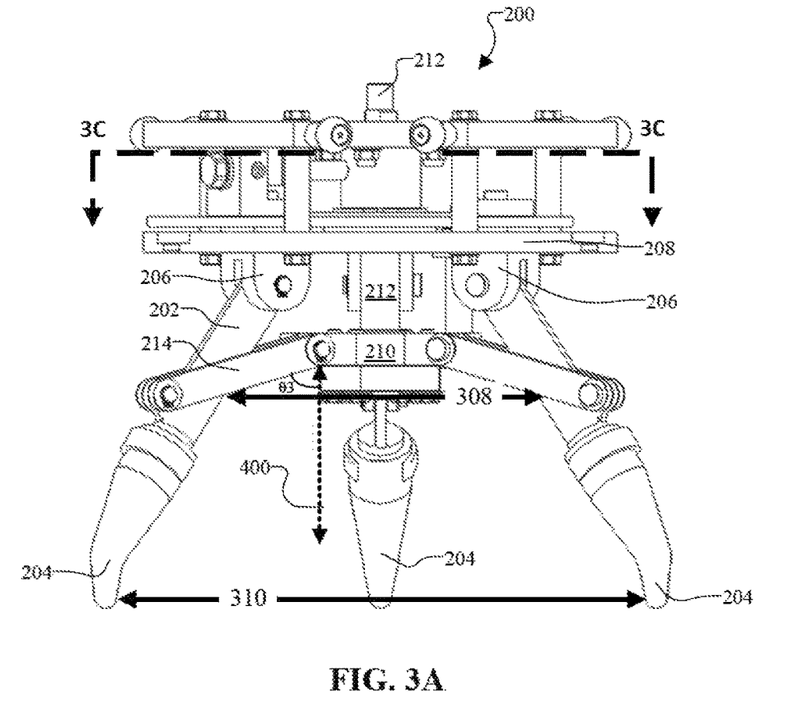
FIG. 3A is a side view of the gripper configured with a second grip setting and in an open position according to an example embodiment of this disclosure.
Figure 3B:
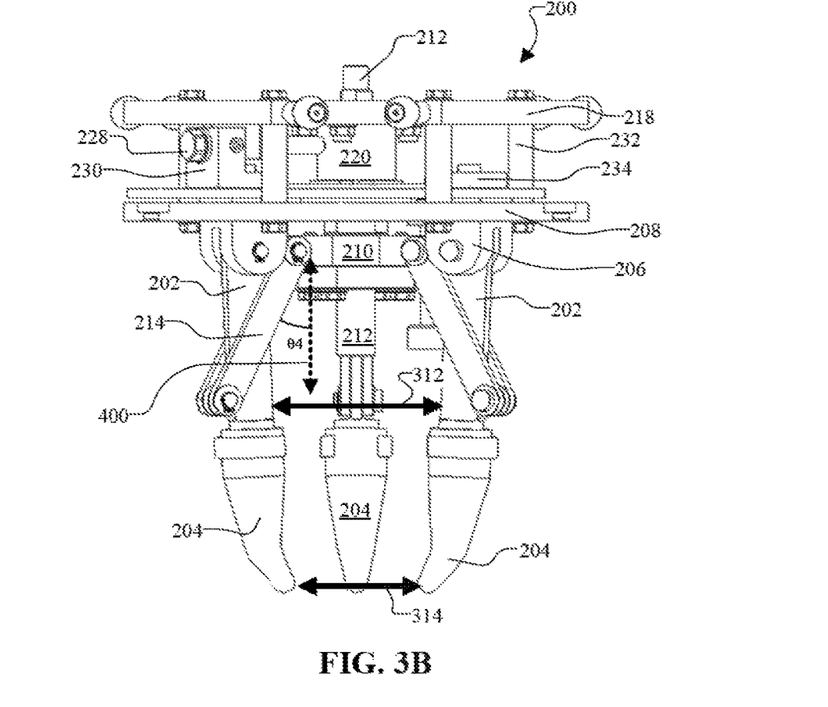
FIG. 3B is a side view of the gripper configured with the second grip setting and in a closed position according to an example embodiment of this disclosure.
Figure 3C:
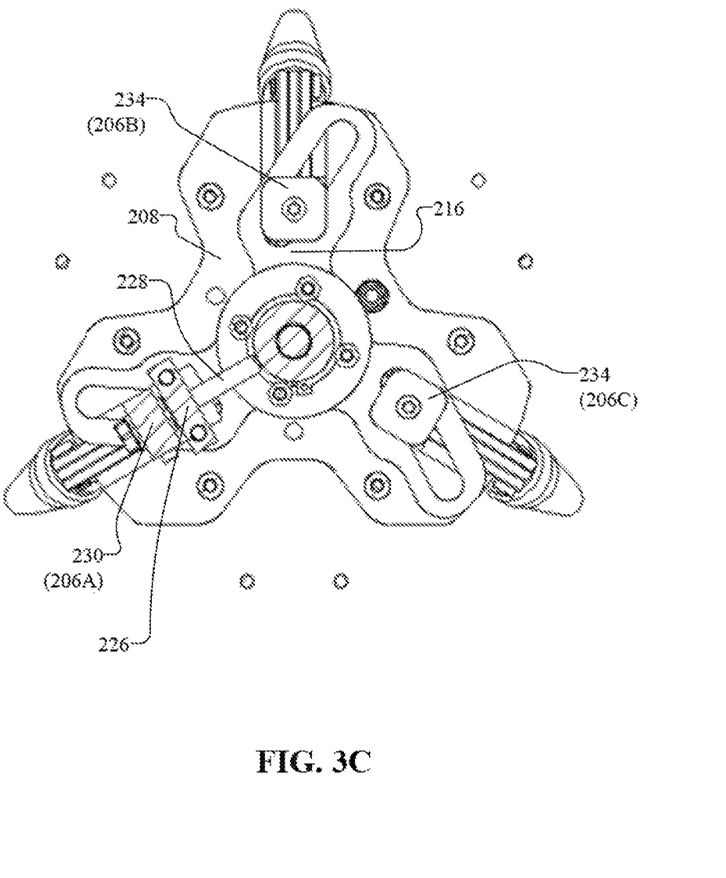
FIG. 3C is a cross-section, taken at line 3C-3C of FIG. 3A, that shows the gripper with the second grip setting according to an example embodiment of this disclosure.

FIGS. 3A, 3B, and 3C illustrate an example of the gripper 200, which is set at a second grip setting. In this second grip setting, the set of mounts 206 are disposed at inner portions of the support plate 208. In this second grip setting, the gripper 200 is configured to provide an open position and a closed position. For example, FIG. 3A illustrates the gripper 200 in an open position of the gripping action. More specifically, when in this open position, the gripper 200 is configured to provide a fifth dimension 308 between fingers 202 and a sixth dimension 310 between fingertips 204. In this example, the sixth dimension 310 is greater than the fifth dimension 308. Furthermore, as shown in FIG. 3A, when the gripper 200 is in the open position and in the second grip setting, the gripper 200 includes the second plate 210 in the first position (e.g., lower position) along the ball screw 212 such that the links 214 extend at a third angle θ3 with respect to the axis 400, thereby enabling the fingers 202 and/or fingertips 204 to achieve the open position. This third angle θ3 is greater than the first angle θ1 such that the fifth dimension 308 is greater than the first dimension 300. Also, the third angle θ3 is greater than the first angle θ1 such that the sixth dimension 310 is greater than the second dimension 302, thereby enabling the second grip setting to handle larger objects better than the first grip setting.

FIG. 3B illustrates the gripper 200 in a closed position while in the second grip setting. When the gripper 200 is configured in this second grip setting, the gripper 200 is configured to provide a seventh dimension 312 between fingers 202 and an eighth dimension 314 between fingertips 204 when in the closed position of the gripping action. In this example, the seventh dimension 312 is larger than the eighth dimension 314. Also, in this example, as shown in FIGS. 3A and 3B, the fifth dimension 308 is greater than the seventh dimension 312 while the sixth dimension 310 is greater than the eighth dimension 314. In this regard, these dimensions of the gripper 200 are set such that the open position provides for the receipt and/or release of an object while the closed position provides for the holding of the object. Furthermore, as shown in FIG. 3B, when the gripper 200 is in the closed position and in the second grip setting, the gripper 200 includes the second plate 210 in the second position (e.g., upper position) along the ball screw 212 such that the links 214 extend at a fourth angle θ4 with respect to the axis 400. In this regard, as shown in FIGS. 3A and 3B, the fourth angle θ4 is less than the third angle θ3 so that the fingers 202 and/or fingertips 204 are angled closer to each other to achieve the closed position. Also, in this example, the fourth angle θ4 is slightly greater than the second angle θ2 such that the seventh dimension 312 is greater than the third dimension 304 and such that the eighth dimension 314 is greater than the fourth dimension 306, thereby enabling the second grip setting to handle larger objects better than the first grip setting.

FIG. 3C illustrates a cross-section, taken at line 3C-3C of FIG. 3A, which provides a view of the second grip setting. This second grip setting is configured when the set of mounts 206, which hold corresponding fingers 202, are positioned in the second arrangement. In this second arrangement, the first mount 206A, the second mount 206B, and the third mount 206C are disposed at inner portions of the support plate 208 and inner portions of the cam plate 216. In this case, the inner portions are closer to a center region of the support plate 208/cam plate 216 than the peripheral portions, which are associated with the first arrangement and the first grip setting. Thus, the inner portions are closer to the ball screw 212 than the peripheral portions. More specifically, in this second arrangement, the first mount 206A, the second mount 206B, and the third mount 206C are disposed at innermost positions, which are defined along the support plate 208 and the cam plate 216, respectively.

In an example embodiment, the set of mounts 206 are positioned into this second arrangement via the finger adjustment assembly. As aforementioned, the finger adjustment assembly includes at least the mount 226, the adjusting device 228 (e.g. bolt or any suitable fastener), and the finger adjustor 230. The adjusting device 228 is adjustable and configured to move the set of mounts 206 into at least this second arrangement. More specifically, the adjusting device 228 is secured to the finger adjustor 230 so that the finger adjustor 230 moves with the adjusting device 228. In addition, the finger adjustor 230 is secured to the first mount 206A so that the first mount 206A moves with the finger adjustor 230. When the first mount 206A moves, the first mount 206A moves the cam plate 216. When the cam plate 216 rotates, the cam plate 216 urges the other mounts (e.g., the second mount 206B and the third mount 206C) to move into similar corresponding positions along the support plate 208 and the cam plate 216 to provide the second arrangement and the second grip setting. Also, as shown in FIG. 3C, the finger adjustor 230 contacts the mount 226 when the adjusting device 228 is adjusted such that the set of mounts 206 are in this second arrangement.

As aforementioned, FIG. 2A and FIG. 3A both illustrate the gripper 200 with its fingers 202 in the open position. However, FIG. 2A and FIG. 3A differ in that FIG. 2A illustrates the gripper 200 configured with the first grip setting while FIG. 3A illustrates the gripper 200 configured with the second grip setting. When in this open position, the gripper 200 has the first dimension 300 between fingers 202 when in the first grip setting that is smaller than the fifth dimension 308 between fingers 202 when in the second grip setting. Also, when in this open position, the gripper 200 has the second dimension 302 between fingertips 204 when in the first grip setting that is smaller than the sixth dimension 310 between fingertips 204 when in the second grip setting. Moreover, the first angle θ1 (FIG. 2A), which is associated with the first grip setting, is smaller than the third angle θ3 (FIG. 3A), which is associated with the second grip setting.

Also, FIG. 2B and FIG. 3B both illustrate the gripper 200 with its fingers 202 in the closed position. However, FIG. 2B and FIG. 3B differ in that FIG. 2B illustrates the gripper 200 configured with the first grip setting while FIG. 3B illustrates the gripper 200 configured with the second grip setting. When in this closed position, the gripper 200 has the third dimension 304 between fingers 202 when in the first grip setting that is smaller than the seventh dimension 312 between fingers 202 when in the second grip setting. Also, when in this closed position, the gripper 200 has the fourth dimension 306 between fingertips 204 when in the first grip setting that is smaller than the eighth dimension 314 between fingertips 204 when in the second grip setting. Moreover, the second angle θ2 (FIG. 2B), which is associated with the first grip setting, is smaller than the fourth angle θ4 (FIG. 3B), which is associated with the second grip setting.

Furthermore, FIG. 2C and FIG. 3C illustrate cross-sections of the gripper 200. More specifically, FIG. 2C illustrates the first grip setting in which the set of mounts 206 are set in the first arrangement while FIG. 3C illustrates the second grip setting in which the set of mounts 206 are set in the second arrangement. In FIG. 2C, the set of mounts 206 are located at peripheral portions of the support plate 208. In this regard, for instance, FIG. 2C shows that the mounts 206, when in this first arrangement, are positioned such that the peripheral edges of the mounts 206 correspond to or align with the peripheral edges of the support plate 208. More specifically, when the first mount 206A, the second mount 206B, and the third mount 206C are disposed at positions along their channels 208C (FIG. 8) that are furthest away from a central region of the support plate, the gripper 200 is set to provide a smallest gripping action (e.g., open position and closed position). Meanwhile, FIG. 3C illustrates the gripper 200 when the set of mounts 206 are located at inner portions of the support plate 208. In this case, the inner positions are associated with the second grip setting, which corresponds to the largest gripping action provided by the gripper 200. More specifically, in this case, when the first mount 206A, the second mount 206B, and the third mount 206C are disposed at positions along their channels 208C that are closest to a central region of the support plate 208, the gripper 200 is set to provide the largest gripping action (e.g., open position and closed position).

As aforementioned, the gripper 200 is configured to include a plurality of grip settings that provide different adjustments for the dimensions between the fingers 202 and/or fingertips 204 of the gripper 200. The plurality of grip settings include at least the first grip setting and the second grip setting along with any other grip setting that resides in a range between the first grip setting and the second grip setting. Accordingly, the gripper 200 is configured to provide various ranges of dimensions between the fingers 202 and/or various ranges of dimensions between the fingertips 204 that are within and/or inclusive of ranges provided by the first grip setting and the second grip setting.

Figure 4:
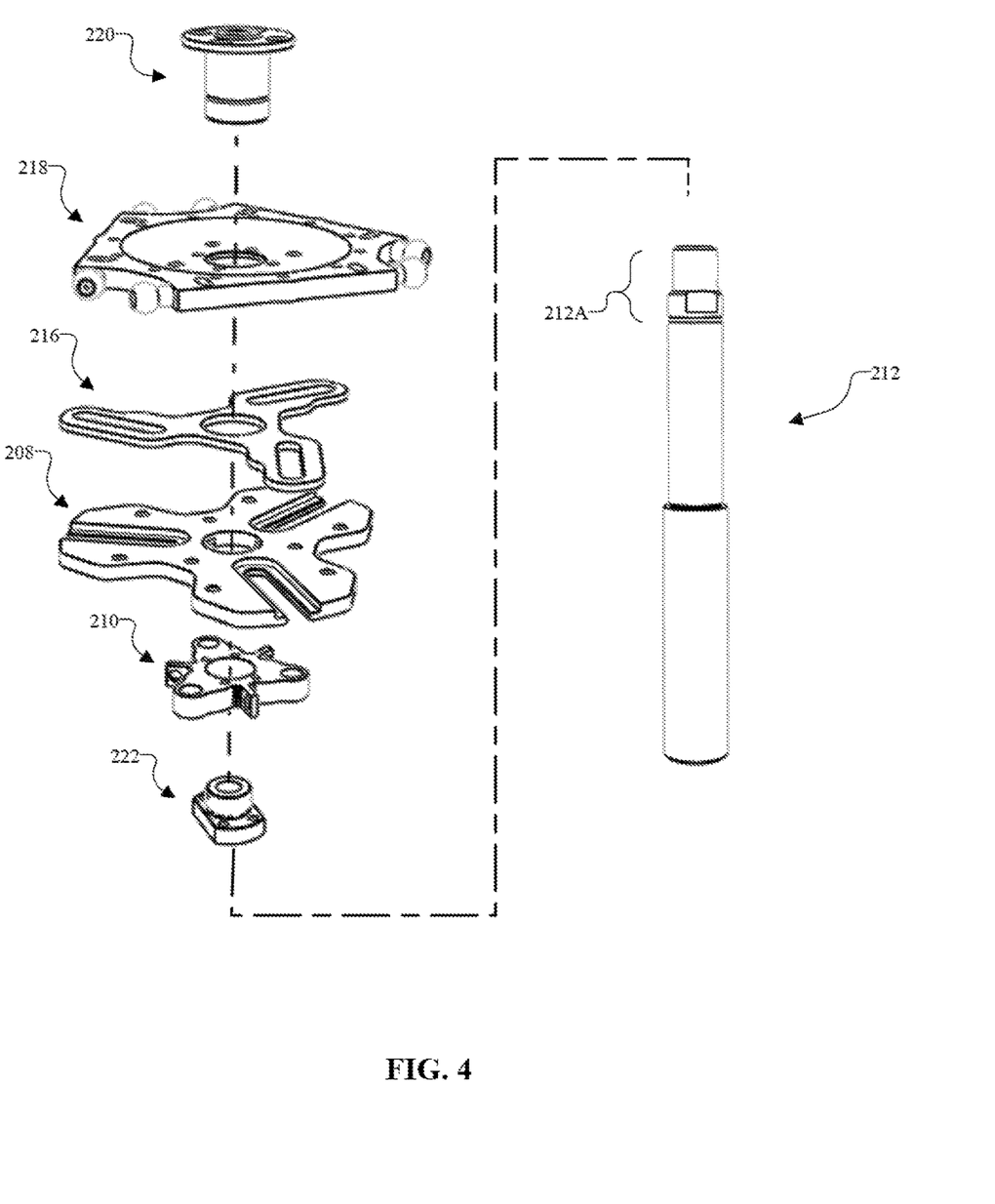
FIG. 4 is an exploded view of some components in relation to the linear actuator according to an example embodiment of this disclosure.

FIG. 4 illustrates the ball screw 212 along with some other components of the gripper 200 according to an example embodiment. In this regard, for example, the ball screw 212 is an elongated member, which is disposed in a central region of the gripper 200. With this central position, the ball screw 212 is configured to be aligned or coaxial with other components of the gripper 200. For example, the ball screw 212 is structured to extend through an opening within the first plate 218 (e.g., delta plate). In addition, the ball screw 212 is configured to extend through an opening in a bearing housing 220, which is positioned between the ball screw 212 and the first plate 218. The ball screw 212 is configured to extend through an opening of the cam plate 216, which is configured to rotate about the ball screw 212. Also, the ball screw 212 is configured to extend through an opening of the support plate 208, which is structured to support the mounts 206. Also, the ball screw 212 is structured to extend through other components (e.g., bushing, bearings, etc.), which are not shown, but can be included with the gripper 200. In addition, the ball screw 212 is structured to extend through an opening of the second plate 210, which is structured to support the links 214. The ball screw 212 is structured to extend through an opening of the ball screw nut 222, which includes an upper, elongated post that is configured to extend between the ball screw 212 and the second plate 210.

The central position of the ball screw 212 relative to these other components, as shown in FIG. 4, enables the ball screw 212 to be equidistant or substantially equidistant to each of the fingers 202. This feature is advantageous in enabling a driving action to be provided to each of the fingers 202 in an efficient manner. For example, in response to stimulus provided by the machine 102 at its first end portion 212A, the ball screw 212 is configured to move or rotate in a first direction such that the gripper 200 moves towards and/or into an open position. Also, in response to another stimulus provided by the machine 102 at its first end portion 212A, the ball screw 212 is configured to move or rotate in a second direction such that the gripper 200 moves towards and/or into a closed position. Also, as shown in FIGS. 2A-2B and FIGS. 3A-3B, the ball screw 212 does not extend beyond the fingers 202 and/or fingertips 204 along the longitudinal axis 402 of the ball screw 212. This feature is advantageous in ensuring that the ball screw 212 does not interfere with the object or at least one finger 202 during a receiving action, a grasping action, holding action, and/or a releasing action.

Figure 5:
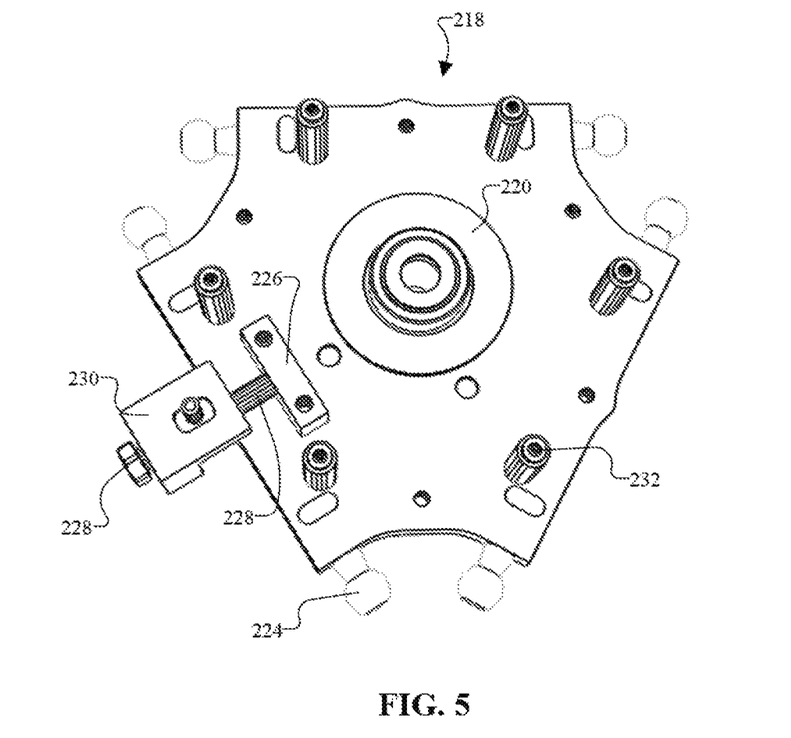
FIG. 5 is a view of one side of a first plate along with some other components of the gripper according to an example embodiment of this disclosure.

FIG. 5 illustrates the first plate 218 of the gripper 200 according to an example embodiment. The first plate 218 provides an interface between one or more components (e.g., servo motors, controller, etc.) of the machine 102 and one or more components of the gripper 200. The first plate 218 comprises any suitable shape. For example, in FIG. 5, the first plate 218 is a delta plate, which includes a delta-shaped cross-section (e.g., triangular shaped cross-section) or a substantially delta-shaped cross-section. In this case, the delta plate is advantageous in providing a structure with three sides, which correspond to the three fingers 202, respectively. In addition, the first plate 218 includes connecting portions, which connect the gripper 200 to robot arms 106. For example, in FIG. 5, the connecting portions include ball and socket joint components 224 that connect the gripper 200 to one or more other components (e.g., servos, motors, robot arms 106, etc.) of the machine 102.

As aforementioned, the first plate 218 is an interface that also connects to other components of the gripper 200. For example, as shown in FIG. 5, the first plate 218 includes a center region with an opening. The first plate 218 is structured to receive the ball screw 212 within the opening. Also, as shown in FIGS. 4-5, the first plate 218 is structured to receive the bearing housing 220 within the opening so that the bearing housing 220 is provided between the first plate 218 and the ball screw 212. In addition, the first plate 218 is structured to support the mount 226 for the adjusting device 228 (e.g. a bolt) associated with the finger adjustor 230. The first plate 218 also includes structural components (e.g., grooves, etc.), which enable fastening components 232 to align and connect the first plate 218 to the support plate 208.

Figure 6:
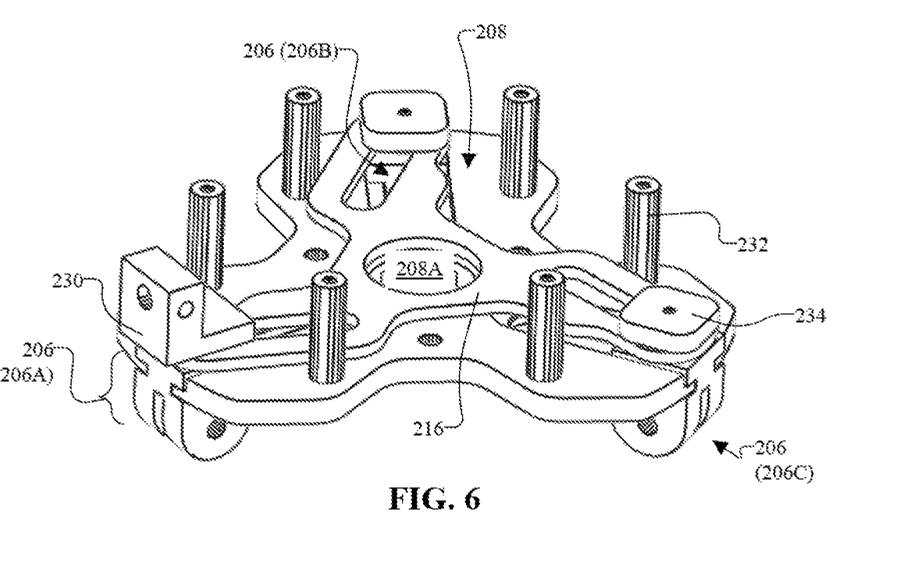
FIG. 6 is a view of one side of a support plate along with some other components of the gripper according to an example embodiment of this disclosure.

FIG. 6 illustrates the support plate 208 along with other components according to an example embodiment. At a center region, the support plate 208 includes an opening 208A to receive the ball screw 212. This opening 208A in the support plate 208 aligns with the openings in other components of the gripper 200 that are disposed about the ball screw 212. The support plate 208 includes a wing portion 208B (FIG. 8) corresponding to each finger 202. Each wing portion 208B extends outward from a center region of the support plate 208. In addition, the support plate 208 is structured to include fastening components 232, which align and connect the support plate 208 to the first plate 218. Also, the support plate 208 is structured to support the set of mounts 206 and enable each mount 206 to move along the support plate 208.

In an example embodiment, the support plate 208 includes channels 208C (FIG. 8), which are configured to receive the mounts 206 and enable the mounts 206 to move to various positions along the support plate 208 in a guided manner. In this case, each wing portion 208B includes a channel 208C. Also, in this case, the wing portions 208B are uniformly positioned about the support plate 208. In addition, as shown in FIG. 8, the channels 208C are uniformly positioned about the support plate 208. In addition, the support plate 208 includes guides for each channel 208C. The guides provide guidance to the mounts 206 along a corresponding channel 208C of the support plate 208. As a non-limiting example, the guides include protruding portions 208D (FIG. 8) along sidewalls 208E, which define the channels 208C of the support plate 208. The protruding portions 208D interact with channels 206F (FIG. 7) of a corresponding mount 206 to enable that mount 206 to move with guidance along the support plate 208. Also, although the support plate 208 is connected to the first plate 218 via the fastening components 232, the support plate 208 is also spaced from the first plate 218 to provide sufficient clearance for the cam plate 216 to perform the functions discussed herein.

Figure 7:
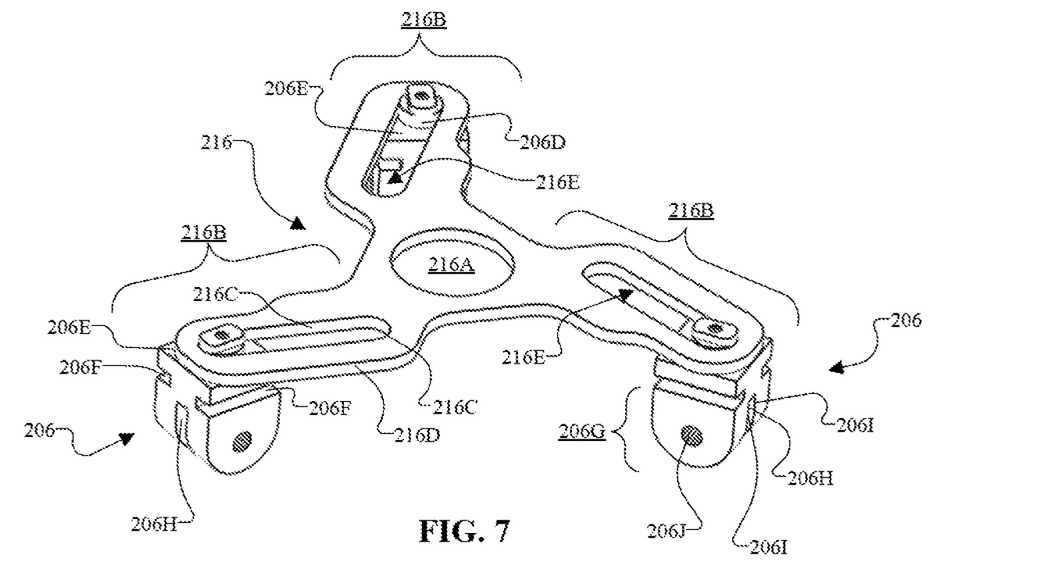
FIG. 7 is a view of a cam plate and a set of mounts according to an example embodiment of this disclosure.
Figure 8:
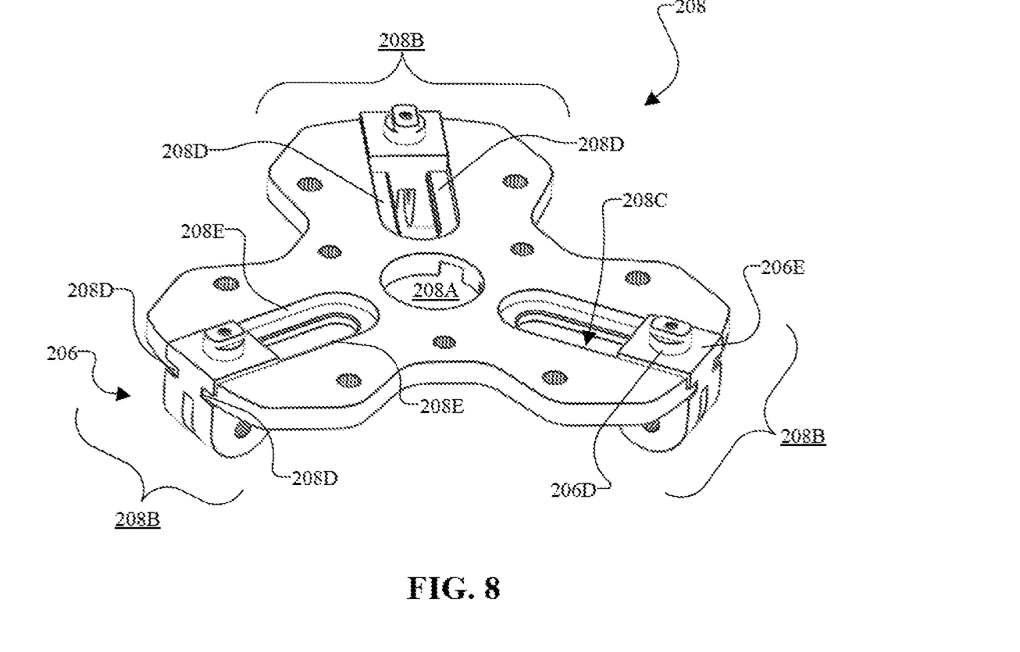
FIG. 8 is a perspective view of a support plate and a set of mounts according to an example embodiment of this disclosure.

FIG. 7 illustrates the cam plate 216 along with the mounts 206 according to an example embodiment. The cam plate 216 is configured to interact with the mounts 206 to adjust the grip setting, thereby enabling at least one dimension of the gripping action to be adjusted. In this regard, as shown in FIGS. 4 and 6, the cam plate 216 is positioned in a space between the first plate 218 (e.g., the "delta plate") and the support plate 208 such that the cam plate 216 is configured to move in accordance with at least one mount 206. More specifically, the cam plate 216 includes a central portion with an opening 216A. The cam plate 216 is configured to receive the ball screw 212 within the opening 216A. With this configuration, the cam plate 216 is configured to rotate in a first direction and a second direction relative to the ball screw 212.

The cam plate 216 is configured to interact with the mounts 206. For example, when at least one mount 206 (e.g. the first mount 206A) moves away from the ball screw 212 and abuts against the cam plate 216, the cam plate 216 rotates relative to the ball screw 212 in the first direction. When the cam plate 216 rotates about the ball screw 212 in the first direction, the cam plate 216 guides, urges, or pushes the other mounts (e.g., second mount 206B and third mount 206C) to move away from the ball screw 212, thereby aligning the set of mounts 206 to positions along their channels 208C with increased distances from the center region of the support plate 208 and towards the first arrangement. Alternatively, when at least one mount 206 (e.g. the first mount 206A) moves towards the ball screw 212 and abuts against the cam plate 216, the cam plate 216 rotates relative to the ball screw 212 in the second direction. When the cam plate 216 rotates about the ball screw 212 in the second direction, the cam plate 216 guides, urges, or pushes the other mounts 206 (e.g., second mount 206B and third mount 206C) to move towards the ball screw 212, thereby aligning the set of mounts 206 to positions along their channels 208C with decreased distances from the center region of the support plate 208 and towards the second arrangement.

In an example embodiment, the cam plate 216 includes a plurality of extension portions 216B. The extension portions 216B extend outward from the central portion of the cam plate 216. In this example, the number of extension portions 216B corresponds to the number of fingers 202, which are provided on the gripper 200. For example, there is a one-to-one correspondence between an extension portion 216B and a finger 202. In FIG. 7, the cam plate 216 includes three extension portions 216B since the gripper 200 includes three fingers 202. In this example, each extension portion 216B has sidewalls 216C and periphery portions 216D, which are at acute angles with respect to a diametric axis of the cam plate 216.

In an example embodiment, each extension portion 216B includes a groove 216E to receive at least a portion of a mount 206. For example, in FIG. 7, the cam plate 216 includes three extension portions 216B with three grooves 216E. The sidewalls 216C that define a closed-shape groove 216E are angled with respect to the sidewalls 208E of the channel 208C. The sidewalls 216C that define the longer sides of each groove 216E are angled with respect to the diametric axis of the cam plate 216. The sidewalls 216C that define the grooves 216E are advantageous in urging the cam plate 216 to rotate when the first mount 206A abuts against the cam plate 216. Also, the sidewalls 216C are advantageous in urging and/or aligning the other mounts (e.g. second mount 206B and third mount 206C) to move along the support plate 208 when the cam plate 216 rotates about the ball screw 212 and abuts against these other mounts (e.g., second mount 206B and third mount 206C). Also, as shown in FIGS. 6-7, the grooves 216E of the cam plate 216 are structured to overlap, at least partly, corresponding channels 208C of the support plate 208, as the mounts 206 interact with the cam plate 216 and the support plate 208.

As discussed above, the gripper 200 includes the set of mounts 206. For example, in FIGS. 6-8, the set of mounts 206 include the first mount 206A, the second mount 206B, and the third mount 206C. The set includes at least one mount 206 (e.g., first mount 206A), which serves as a lead mount. The lead mount (e.g., first mount 206A) is connected to the finger adjustor 230 while the other mounts (second mount 206B and the third mount 206C) are provided with protective caps 234. With its connection to the finger adjustor 230, the lead mount is configured to move when the adjusting device (e.g. bolt) moves the finger adjustor 230. In addition, responsive to the finger adjustor 230, the lead mount is configured to abut against the cam plate 216. When the lead mount moves the cam plate 216, the cam plate 216 is configured to guide, urge, or push these other mounts 206 (e.g. second mount 206B and third mount 206C) into corresponding positions, which align at similar positions along their channels 208C with respect to a position of the lead mount (e.g., first mount 206A). The similar positions correspond to similar distances away from a center of the support plate 208.

The mounts 206 are configured to engage with the cam plate 216. For example, each mount 206 includes a protrusion 206D (FIG. 7), which is configured to pass through and move within a groove 216E of the cam plate 216. In this regard, the sidewalls 216C, which define the groove 216E, are structured to guide the protrusion 206D. In FIG. 7, for instance, the protrusion 206D extends outward from a surface 206E of the mount 206. The protrusion 206D is positioned at a center region of an upper surface 206E of the mount 206. The protrusion 206D has a cross-section with a round shape or any suitable shape that enables that mount 206 to move relative to the cam plate 216.

FIG. 8 illustrates the mounts 206 together with the support plate 208. Each mount 206 includes guide members on opposite sides of the mount 206. The guide members enable the mounts 206 to move to different positions along the support plate 208. For instance, the mounts 206 include channels 206F (FIG. 7) as guide members that are structured to interact with corresponding guide members (e.g., protruding portions 208D) of the support plate 208. Also, the channels 206F are disposed on upper side portions of the mounts 206. More specifically, each channel 206F extends all of the way through an end of the mount 206 to an opposite end of that mount 206, thereby enabling the mount 206 to slide along the protruding portions 208D of the support plate 208.

In an example embodiment, the mounts 206 are configured to support the fingers 202. In this regard, each mount 206 is structured to provide a mount for a corresponding finger 202. The connection of the mount 206 to the finger 202 is configured such that a movement of that mount 206 corresponds to a movement of that finger 202, thereby enabling a dimension of a gripping action between fingers 202 to be adjusted. The mount 206 includes a finger mounting portion 206G (FIG. 7). For example, in FIGS. 7-8, the finger mounting portion 206G is disposed below the guide members (e.g., channels 206F). The finger mounting portion 206G includes a slot 206H to receive an end portion of a finger 202. The slot 206H is open at a side of the mount 206 that is opposite to the side from which the protrusion 206D extends. The slot 206H is defined between two wall portions 206, which are configured to support the finger 202. The finger 202 is configured to pivot within the slot 206H. The finger mounting portion 206G includes a through-hole 206J that extends from one side of the mount 206 to an opposite side of the mount 206 while passing through the slot 206H. The finger mounting portion 206G is configured to receive a fastener via the through-hole 206J. The fastener pivotally connects the finger 202 to the mount 206 so that the finger 202 is configured to move outward into the open position and inward into the closed position. In this regard, the fingers 202 are configured to move pivotally via the mounts 206 while also being configured to move pivotally via links 214.

Figure 9:
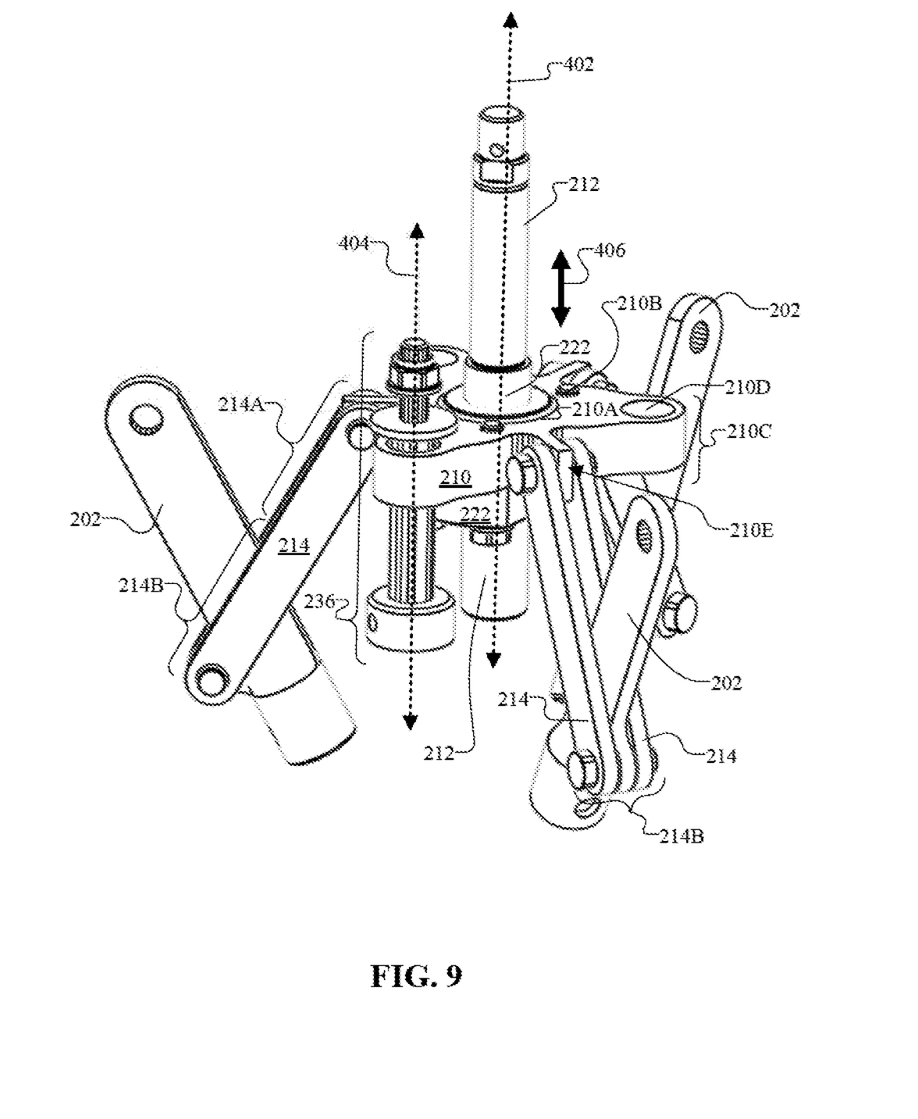
FIG. 9 is a perspective view of a second plate in relation to some other components of the gripper according to an example embodiment of this disclosure.

FIG. 9 illustrates the second plate 210 in relation to other components according to an example embodiment. For example, FIG. 9 illustrates the second plate 210 in relation to the ball screw 212. In this regard, the second plate 210 has a body with a center region that includes a through-hole 210A to receive the ball screw 212. In addition, the second plate 210 is structured via the through-hole 210A to receive a ball screw nut 222, which is disposed between the second plate 210 and the ball screw 212. In this case, as shown in FIG. 9, the ball screw nut 222 is fastened to the second plate 210 via fasteners 210B to enable the second plate 210 to move with the ball screw nut 222 along the longitudinal axis 402 of the ball screw 212. For example, the second plate 210 and the ball screw nut 222 are configured to move in a first direction towards the first position (e.g., lower position) to achieve the open position and also move in a second direction towards the second position (e.g., upper position) to achieve the closed position, as indicated by arrow 406. More specifically, in response to a movement of the ball screw 212 (e.g., rotation of the ball screw 212), the second plate 210 is configured to move along the ball screw 212. For example, when the second plate 210 is at the first position (e.g., FIG. 2A and FIG. 3A) along the ball screw 212, the second plate 210 is positioned so that the links 214 are at suitable angles (e.g., first angle θ1 and third angle θ3) with respect to the ball screw 212 to urge or position the fingers 202 into the open position. As another example, when the second plate 210 is at a second position (e.g., FIG. 2B and FIG. 3B) along the ball screw 212, the second plate 210 is positioned so that the links 214 are at suitable angles (e.g., second angle θ2 and fourth angle θ4) with respect to the ball screw 212 to urge or position the fingers 202 into the closed position.

In an example embodiment, the second plate 210 is also configured to support a stopper 236. For example, in FIG. 9, the second plate 210 is configured to include body portions 210C with openings 210D. The second plate 210 is structured to receive the stopper 236 through any one of the openings 210D. In this regard, for instance, the stopper 236 is configured to prevent the second plate 210 from rotating when the ball screw 212 is rotated. The stopper 236 is also configured to act as a hard stop by preventing the ball screw 212 from being over-rotated. In this case, the stopper 236 includes at least at least an elongated part, such as a rod or bar, with various mechanical fastening components to provide the functionality described herein. A longitudinal axis 404 of the elongated part of the stopper 236 extends parallel or substantially parallel to the longitudinal axis 402 of the ball screw 212.

In addition, the second plate 210 includes link connecting portions. For example, as shown in FIG. 9, the second plate 210 includes three projecting portions 210E, which correspond to the three fingers 202. The projecting portions 210E alternate with the body portions 210C such that each projecting portion 210E is between adjacent body portions 210C. The projecting portions 210E are equidistant from each other. For instance, in FIG. 9, the projecting portions 210E extend outward from the body of the second plate 210. Each projecting portion 210E has a same or substantially similar thickness as the corresponding finger 202 so that a pair of links 214 is configured to sandwich the projecting portion 210E of the second plate 210 at a first end portion 214A and sandwich the finger 202 at a second end portion 214B with stability.

Figure 10:
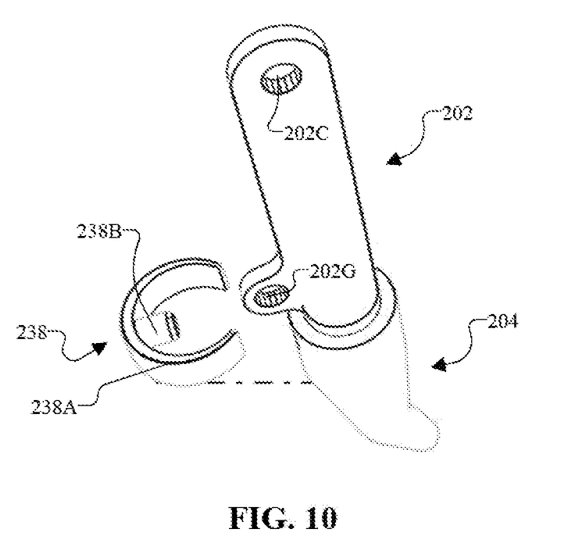
FIG. 10 is an exploded view of the clip in relation to the finger and fingertip according to an example embodiment of this disclosure.
Figure 11:
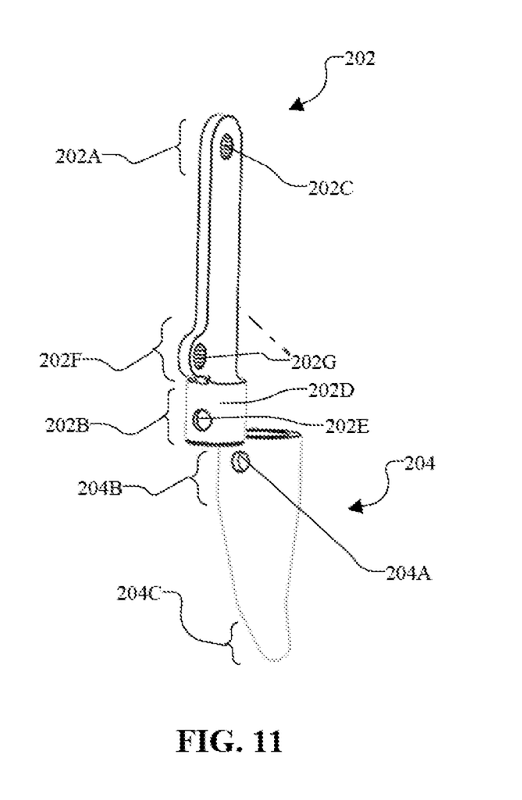
FIG. 11 is an exploded view of the finger and fingertip according to an example embodiment of this disclosure.

FIGS. 10-11 illustrate the finger 202 and fingertip 204 according to an example embodiment. The finger 202 is an elongated structure with a first end portion 202A and a second end portion 202B. At the first end portion 202A, the finger 202 is flat (or substantially flat) and includes a through-hole 202C to receive a fastener, which pivotally connects the finger 202 to the mount 206. At the second end portion 202B, the finger 202 includes a fingertip connector 202D in which the fingertip 204 is attachable and detachable. For instance, in FIG. 11, the fingertip connector 202D includes a cylindrical or substantially cylindrical part, which extends outward from the second end portion of the elongated structure. The fingertip connector 202D is structured to mate with a corresponding portion of the fingertip 204 such that the fingertip 204 is attachable and detachable from the finger 202. Also, when connected, the finger 202 and fingertip 204 are configured to engage with a fastener (e.g. clip 238), to secure the finger 202 and fingertip 204 to each other. The clip 238 is configured to hold the connection between the finger 202 and the fingertip 204. In this case, for instance, the clip 238 includes a main part 238A that embraces an outer portion of the fingertip 204. Also, the finger 202 includes a through-hole 202E and the fingertip 204 includes a through-hole 204A. The through-hole 202E and the through-hole 204A are configured to align and receive a protruding part 238B of the clip 238. The clip 238 is also configured to disengage from the finger 202 and fingertip 204 so that the fingertip 204 is detachable and removable from the finger 202.

The finger 202 includes a link connecting portion 202F, which connects to a corresponding pair of links 214. For example, in FIGS. 10-11, the link connecting portion 202F includes a through-hole 202G to receive a fastener that pivotally connects the finger 202 to a pair of links 214. As shown in FIGS. 10-11, the link connecting portion 202F extends outward from the elongated structure. The link connecting portion 202F is positioned between the first end portion 202A and the second end portion 202B. In this case, the link connecting portion 202F is adjacent to the second end portion 202B. With this connection, a movement of a pair of links 214 corresponds to a movement of the corresponding finger 202.

The fingertip 204 is attachable to and detachable from the finger 202. This feature is advantageous in providing the gripper 200 with the ability to replace, switch, clean, fix or perform any action relating to the fingertips 204. For example, in FIG. 11, each fingertip 204 includes a first end portion 204B, which includes a hollow structure to receive the finger 202 therein. The first end portion 204B of the fingertip 204 is configured to connect with the second end portion 202B of the finger 202. When the fingertip 204 is attached to the finger 202, the fingertip 204 is configured to be secured to the finger 202 via a suitable fastener. For example, in FIG. 10, the fastener is the clip 238, which is configured to engage with an outer circumferential portion of the fingertip 204 while the finger 202 is received within the fingertip 204 such that the finger 202 is connected to the fingertip 204. Also, as shown in FIG. 11, the fingertip 204 is tapered to be wider at the first end portion 204B and narrower at the second end portion 204C. In addition, the second end portion 204C is slightly angled or curved with respect to the axis 400, thereby enabling various types of objects to be handled in an effective manner.

As described herein, the gripper 200 includes a number of advantageous features and benefits. For example, the gripper 200 is applicable to various types of robots (e.g., industrial robots, etc.). Moreover, the gripper 200 has the flexibility to grip and move various sized products with the same assembly, thereby providing fast change-over time without requiring changes thereto to accommodate these various sizes of products. Also, the gripper 200 includes a quick-change feature, whereby each fingertip 204 is attachable to and detachable from (e.g., for replacement, cleaning, etc.) its finger 202 via at least one clip 238.

In addition, the gripper 200 is configured to provide a gripping action of the fingers 202, which is driven with a servo (e.g. fourth-axis servo of the system 100), thereby being more controllable and repeatable than conventional robot gripping actions that are driven with pneumatics. Also, the gripper 200 is configured to provide a gripping action that has a range, which is driven by the fourth axis servo, thereby enabling for recipe driven product changeovers. The gripper 200 includes a cam plate 216, which is driven with a servo (e.g., fifth-axis servo of the system 100), thereby enabling recipe driven product changeovers.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments and may be described using different terminology. These and other variations, modifications, additions, and improvements may fall within the scope of the disclosure as defined in the claims that follow.

What is claimed is:

1. A gripper comprising:
   a plurality of fingers including a first finger and a second finger;
   a first mount to support the first finger;
   a second mount to support the second finger;
   a support plate to support the first mount and the second mount; and
   a cam plate to interact with the first mount and the second mount to provide a plurality of arrangements on the support plate, the plurality of arrangements including a first arrangement and a second arrangement;
   wherein:
      when the first mount and the second mount are in the first arrangement, the gripper is provided with a first distance between the first finger and the second finger when the gripper is in an open position;
      when the first mount and the second mount are in the second arrangement, the gripper is provided with a second distance between the first finger and the second finger when the gripper is in the open position; and
      the second distance is greater than the first distance such that the gripper is operable to accommodate a larger object when the first mount and the second mount are in second arrangement than when the first mount and the second mount are in the first arrangement.

2. The gripper of claim 1, wherein:
   the first mount and the second mount are disposed at outer portions of the support plate while in the first arrangement; and
   the first mount and the second mount are disposed at inner portions of the support plate while in the second arrangement; and
   the inner portions of the support plate are closer to a center region of the support plate than the outer portions of the support plate.

3. The gripper of claim 1, further comprising:
   a third finger; and
   a third mount to support the third finger;
   wherein:
      the support plate supports the third mount; and
      the third mount is movable into a first position associated with the first arrangement when the cam plate moves in a first direction and movable into a second position associated with the second arrangement when the cam plate moves in a second direction.

4. The gripper of claim 1, further comprising:
   a linear actuator to extend through an opening of the cam plate;
   wherein:
      the cam plate is rotatable in a first direction to urge the second mount to move into a first position associated with the first arrangement; and
      the cam plate is rotatable in a second direction to urge the second mount to move into a second position associated with the second arrangement.

5. The gripper of claim 1, wherein:
   the support plate includes a first channel and a second channel;
   the first mount is movable along the first channel; and
   the second mount is movable along the second channel.

6. The gripper of claim 1, further comprising:
   a linear actuator;
   an adjusting device movable towards the linear actuator and movable away from the linear actuator; and
   a finger adjustor connected to the adjusting device such that the finger adjustor moves with the adjusting device,
   wherein:
      the finger adjustor is connected to the first mount such that the first mount moves in accordance with the finger adjustor;
      when the adjusting device moves away from the linear actuator, the first mount moves towards a first position associated with the first arrangement and urges the cam plate to move the second mount towards another first position associated with the first arrangement; and
      when the adjusting device moves towards the linear actuator, the first mount moves towards a second position associated with the second arrangement and urges the cam plate to move the second mount towards another second position associated with the second arrangement.

7. The gripper of claim 1, further comprising:
   a first fingertip; and
   a second fingertip;
   wherein:
      the first fingertip is attachable and detachable from the first finger; and
      the second fingertip is attachable and detachable from the second finger.

8. The gripper of claim 1, further comprising:
   a linear actuator;
   a plate movable along the linear actuator;
   a first link connected to the plate and the first finger; and
   a second link connected to the plate and the second finger.

9. A system comprising:
   a servo;
   a gripper operable to be driven by the servo, the gripper comprising:
      a plurality of fingers including a first finger and a second finger;
      a first mount to support the first finger;
      a second mount to support the second finger;
      a support plate to support the first mount and the second mount; and
      a cam plate to interact with the first mount and the second mount to provide a first arrangement and a second arrangement;
      wherein:
         when the first mount and the second mount are in the first arrangement, the gripper is provided with a first distance between the first finger and the second finger when the gripper is in an open position;
         when the first mount and the second mount are in the second arrangement, the gripper is provided with a second distance between the first finger and the second finger when the gripper is in the open position; and
         the second distance is greater than the first distance such that the gripper is configured to accommodate a larger object when the first mount and the second mount are in the second arrangement than when the first mount and the second mount are in the first arrangement.

10. The system of claim 9, wherein:
    the first mount and the second mount are disposed at outer portions of the support plate while in the first arrangement; and the first mount and the second mount are disposed at inner portions of the support plate while in the second arrangement; and the inner portions of the support plate are closer to a center region of the support plate than the outer portions of the support plate.

11. The system of claim 9, further comprising:
a third finger; and
a third mount to support the third finger;
wherein:
  the support plate supports the third mount;
  the third mount is movable into a first position associated with the first arrangement when the cam plate moves in a first direction; and
  the third mount is movable into a second position associated with the second arrangement when the cam plate moves in a second direction.

12. The system of claim 9, further comprising:
a linear actuator to extend through an opening in the cam plate;
wherein:
  the cam plate is rotatable in a first direction to urge the second mount to move into a first position associated with the first arrangement; and
  the cam plate is rotatable in a second direction to urge the second mount to move into a second position associated with the second arrangement.

13. The system of claim 9, wherein:
the support plate includes a first channel and a second channel;
the first mount is movable along the first channel; and
the second mount is movable along the second channel.

14. The system of claim 9, further comprising:
a linear actuator;
an adjusting device configured to move towards the linear actuator and away from the linear actuator; and
a finger adjustor connected to the adjusting device such that the finger adjustor moves with the adjusting device,
wherein:
  the finger adjustor is connected to the first mount such that the first mount moves in accordance with the finger adjustor;
  when the adjusting device moves away from the linear actuator, the first mount urges the cam plate to rotate in a first direction such that the second mount moves towards a first position associated with the first arrangement; and
  when the adjusting device moves towards the linear actuator, the first mount urges the cam plate to rotate in a second direction such that the second mount moves towards a second position associated with the second arrangement.

15. The system of claim 9, further comprising:
a first fingertip; and
a second fingertip;
wherein:
  the first fingertip is attachable and detachable from the first finger; and
  the second fingertip is attachable and detachable from the second finger.

16. The system of claim 9, further comprising:
a linear actuator;
a plate movable along the linear actuator;
a first link connected to the plate and the first finger; and
a second link connected to the plate and the second finger.

17. A gripper comprising:
a plurality of fingers including a first finger and a second finger;
a linear actuator to drive an action of the plurality of fingers;
a plurality of mounts including a first mount to support the first finger and a second mount to support the second finger;
a support plate to support the plurality of mounts in a plurality of arrangements on the support plate, the plurality of arrangements including a first arrangement and a second arrangement;
a cam plate to interact with the plurality of mounts to provide the first arrangement and the second arrangement, the cam plate being rotatable relative to the linear actuator;
a finger adjustor connected to the first mount such that the first mount moves with the finger adjuster; and
wherein:
  when the finger adjustor moves away from the linear actuator, the first mount urges the cam plate to move the second mount towards a first position associated with the first arrangement to achieve a first distance between the first finger and the second finger;
  when the finger adjustor moves towards the linear actuator, the first mount urges the cam plate to move the second mount towards a second position associated with the second arrangement to achieve a second distance between the first finger and the second finger; and
  the second distance is greater than the first distance.

18. The gripper of claim 17, wherein:
the first mount and the second mount are disposed at outer portions of the support plate while in the first arrangement; and
the first mount and the second mount are disposed at inner portions of the support plate while in the second arrangement; and
the inner portions of the support plate are closer to a center region of the support plate than the outer portions of the support plate.

19. The gripper of claim 17, further comprising:
a third finger; and
a third mount to support the third finger;
wherein:
  the support plate to support the third mount;
  the third mount is movable into another first position associated with the first arrangement when the cam plate moves in a first direction; and
  the third mount is movable into another second position associated with the second arrangement when the cam plate moves in a second direction.

20. The gripper of claim 17, further comprising:
a first fingertip; and
a second fingertip;
wherein:
  the first fingertip is attachable and detachable from the first finger; and
  the second fingertip is attachable and detachable from the second finger.

* * * * *